United States Patent

[11] 3,629,839

[72] Inventors James Owen Dimmick; Theras Gordon Lewis; John Francis O'Neill, all of Boulder, Colo.

[21] Appl. No. 27,892
[22] Filed Apr. 13, 1970
[45] Patented Dec. 21, 1971
[73] Assignee Bell Telephone Laboratories, Incorporated Murray Hill, Berkeley Heights, N.J.

[54] TIME DIVISION MULTIPLEX SWITCHING SYSTEM
27 Claims, 11 Drawing Figs.

[52] U.S. Cl. .... 340/172.5, 179/15 BA
[51] Int. Cl. .... H04j 3/00
[50] Field of Search .... 340/172.5; 179/15 BA

[56] References Cited
UNITED STATES PATENTS

| | | | |
|---|---|---|---|
| 3,134,856 | 5/1964 | Jorgensen | 179/15 |
| 3,478,170 | 11/1969 | Hanni | 179/15 |
| 3,478,171 | 11/1969 | Shimasaki et al. | 179/15 |

*Primary Examiner*—Raulfe B. Zache
*Attorneys*—R. J. Guenther and James Warren Falk

ABSTRACT: A time division switching system includes a first and a second group of storage devices. A selected first group storage device is connected to a first common bus and a selected second group storage device is connected to a second common bus during the same time interval. The outputs of the selected storage devices on the buses are sampled from the buses and opposite polarity constant current pulses are applied to said common buses for a period of time corresponding to the difference between the sampled outputs whereby the sampled outputs are exchanged between the selected storage devices.

INVENTORS: J.O. DIMMICK
T.G. LEWIS
J.F. O'NEILL
BY
ATTORNEY

TIME DIVISION MULTIPLEX SWITCHING SYSTEM

BACKGROUND OF THE INVENTION

Our invention is related to information transfer systems; more particularly to time division switching systems; and more particularly to time division switching systems utilizing asynchronous active energy transfer arrangements.

Time division switching systems permit simultaneous exchange of information between selectively connected active terminals over a common communication link. Each information exchange between a pair of terminals occurs in a selected recurring interval or time slot of a repetitive group of time slots. During each scan of the time slot group, pairs of active terminals are connected in sequence to the common link in preassigned sequential time slots. In one time slot a channel is provided between a pair of selected terminals; the information at each terminal assigned to the connection is sampled; and the sampled information is exchanged between the selected terminals over the common link. The common link is available to other connections during the remaining time slots of the scan. As is well known in the art, the sampling rate may be selected to provide an accurate transfer of signals between selectively connected terminals.

In generally known time division switching systems, the time slots are of fixed duration regardless of the quantity of energy exchanged between connected terminals. The time slot duration is selected to allow the transfer of the maximum expected energy. Where speech and other types of audio signals are transferred between active terminals, it is known that the amount of energy transferred in a time slot is variable and that the maximum energy transfer is required only during a very small number of time slots. In a speech connection, for example, a terminal pair may be silent for a considerable portion of the conversation time. Thus, the average amount of speech energy exchanged during the fixed time slot period is much smaller than the maximum energy. Consequently, a time division switching arrangement utilizing constant duration time slots is not used in an efficient manner.

The communication link between active terminals comprises a plurality of high-speed switches, each of which has a finite resistance that contributes to the attenuation of the energy being transferred. In resonant energy transfer multiplex arrangements, the switch resistance may result in appreciable signal losses. Some priorly known time division switching systems include an amplifier arrangement which operates to provide additional energy during the information transfer to offset switch losses. The amplifier arrangement, however, usually results in greater equipment complexity and the addition of further controls.

BRIEF SUMMARY OF THE INVENTION

Our invention is a switching system having first and second groups of storage devices. The signal from a selected first group storage device and the signal from a second group storage device are concurrently applied to a timing circuit which produces a pulse having a duration corresponding to the difference between said signals. In response to the timing circuit pulse, a first type signal is applied to said selected first group storage device and a second type signal is applied to said selected second group storage device for said timing circuit pulse duration.

According to one aspect of the invention, a time division switching system includes first and second groups of storage devices. A storage device of the first group is selectively connected to a first common bus and a storage device of the second group is selectively connected to a second common bus during the same time period. The outputs of the selectively connected storage devices are applied to the connected common buses and are sampled therefrom. In response to the sampled outputs, a constant amplitude signal of one polarity is applied to the first group device and a constant amplitude signal of the opposite polarity is applied to the second group device. The duration of each of the constant amplitude signals corresponds to the difference between the sampled outputs whereby the signal transfer period corresponds to the actual amount of sampled output energy being exchanged between the selectively connected storage devices.

According to another aspect of the invention, a plurality of local storage device groups are connectable to the first common bus and another plurality of local storage device groups are connectable to the second common bus. Each local group comprises a plurality of storage devices that are selectively connectable to a pair of local group buses. The local group bus pair is in turn connectable to the associated common bus. The local group bus pair is serviced by an associated constant amplitude signal source arrangement. During a discrete time period within each scan, a first common bus group storage device is connected via the local group bus pair to the first common bus and a second common bus group storage device is connected to the second bus via its local group bus pair. The outputs of the selected devices on the common buses are sampled and the sampled outputs are applied to a timing circuit which produces an output signal for an interval corresponding to the difference between the sampled outputs. The timing circuit output is applied to the constant amplitude signal sources associated with each selected device during said interval. The polarity of the constant amplitude signal source output is controlled so that sampled outputs are exchanged between the selected devices during said interval.

According to another aspect of the invention, the constant amplitude signals are generated in oppositely poled constant current sources and the duration of each of the current source signal is proportional to the difference between the sampled outputs applied to the first and second buses.

According to another aspect of the invention, selected pairs of first and second group storage devices are connected to the first and second common buses in succession during repetitive asynchronous scans wherein the time slot for each successive transfer varies in accordance with the difference in sampled storage device signals. The duration of each scan period is then directly related to the sum of the variable time intervals utilized for the energy exchange between each selected pair of storage devices.

According to another aspect of the invention, the variation in scan periods is controlled by a logic arrangement responsive to a comparison between the duration of the preceding time slot periods and the average energy transfer intervals. The logic arrangement controls the start of the next energy transfer time slot in accordance with the average energy transfer interval. In this way, the rate of occurrence of time slots and the durations of the scans are maintained within predetermined limits.

According to one illustrative embodiment of the invention, each of a plurality of stations is selectively connectable to a first common bus via a sampling gate and a filter including a storage capacitor, and each of a plurality of trunks is selectively connectable to a second common bus via a sampling gate and a filter including a storage capacitor. A control circuit comprises a store which is operative through a selection decoder to connect a selected station to the first common bus and a selected trunk to the second common bus in one of a group of time slots occurring in repetitive cycles. During the first portion of the time slot, the selected station and the selected trunk are addressed; and the voltages on the selected storage capacitors are transferred to the associated common buses via the sampling gates. The sampled voltages from the buses are applied to a timing circuit operative to generate a signal having a duration proportional to the difference between the sampled voltages. A pair of oppositely poled high-impedance current sources are connectable to each common bus; and during a second portion of the time period, the timing circuit signal causes one of the pair of current sources to be connected to its associated buses for said time duration. The polarity of the connected current source is selected to charge the selected storage device in accordance with the polarity of the sampled voltage difference.

Upon the termination of the timing circuit signal, the sampling gates are closed and both common buses are connected to a ground reference potential whereby the residual voltages are removed from said buses. A new time period is then initiated in which a second station and a second trunk are connected in accordance with the contents of the control circuit store. In accordance with the invention, the duration of the timing signal is proportional to the energy being transferred between selected storage capacitors whereby the time period is limited to that actually required for the exchange of sampled information. Advantageously, the use of high-impedance constant-current sources eliminates the signal losses due to the sampling gate resistance.

According to another illustrative embodiment of the invention, each common bus is connectable to a plurality of local groups via a set of sampling gates. The local group comprises a plurality of storage capacitors which are selectively connectable to a pair of local buses. One local bus is connectable to a positive current source and the other local bus is connectable to a negative current source. During the first portion of each time slot, a selected storage capacitor from a local group of the first common bus is sampled and a selected storage capacitor from a local group of the second common bus is sampled via selected sampling gates. The sampled voltage transmitted to the common buses from the storage capacitors are applied to a timing circuit which circuit produces a current source control pulse having a duration corresponding to the difference between the sampled voltages. The control pulse is transmitted to the local current sources associated with each selected storage capacitor. The storage capacitor with the more positive sample voltage is connected to the negative current source associated therewith, and the storage capacitor having the less positive sampled voltage is connected to the positive current source associated therewith. Upon the termination of the control pulse, the local buses and the common buses are isolated from the storage capacitors and the current sources and the buses are connected to a ground reference potential to remove any voltage stored on the parasitic bus capacitance. A signal is then generated to start the succeeding time slot.

DETAILED DESCRIPTION

Figure 1:
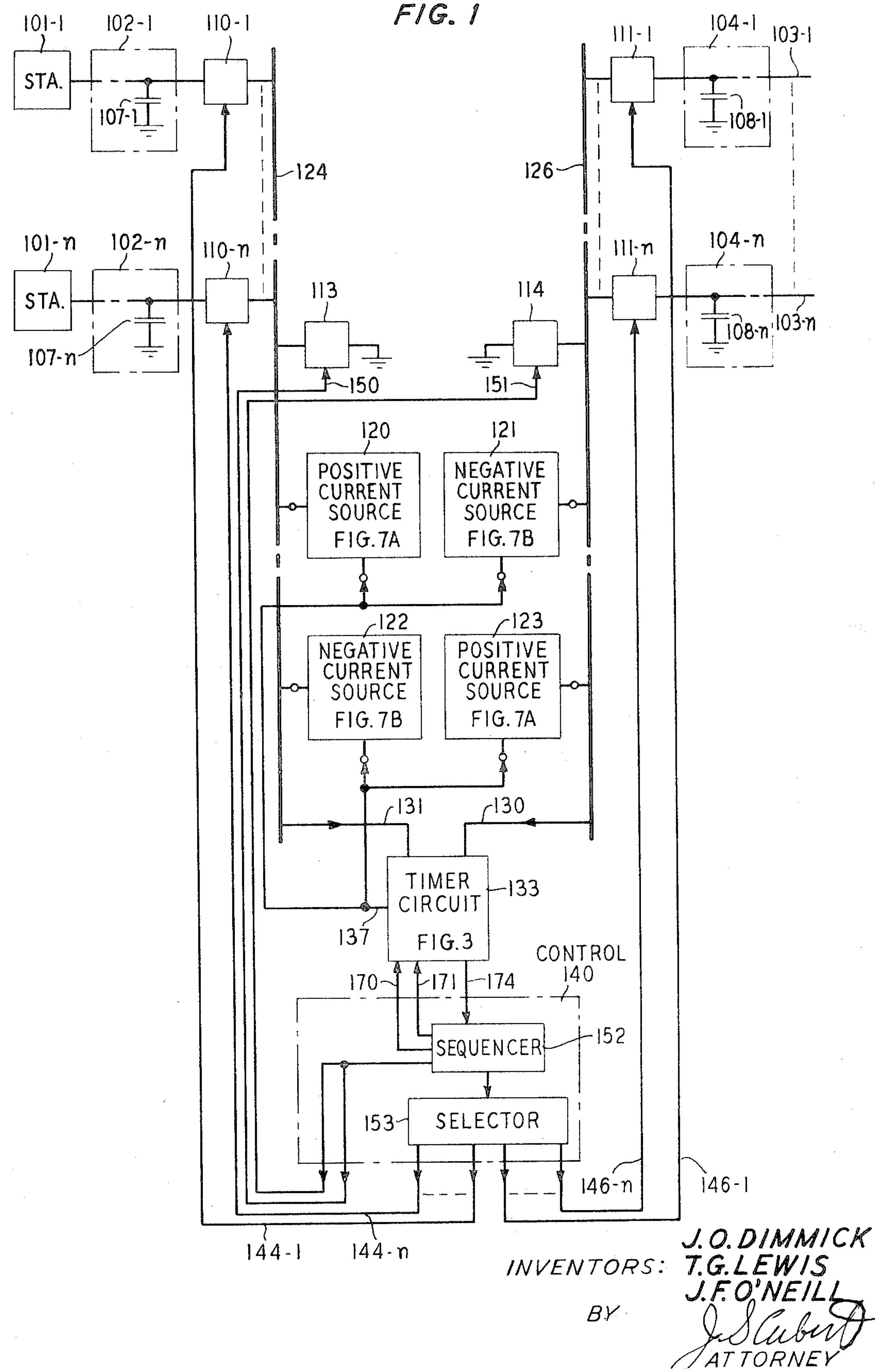
FIG. 1 depicts one illustrative embodiment of the invention in which a single group of storage devices is coupled to each of the common buses.

Referring to FIG. 1, stations 101–1 through **101–*n* are connectable to common bus 124 via filter circuits 102–1 through 102–*n* and sampling gates 110–1 through 110–*n*, respectively. Lines 103–1 through 103–*n* are connectable to second common bus 126 via filters 104–1 through 104–*n* and sampling gates 111–1 through 111–*n*, respectively. The sampling gates are controlled by control 140 so that a selected station and a selected line are connected to their respective common buses in a distinct time slot. The active stations and lines are connected in accordance with the operation of selector 153 of control 140 in successive time slots of each scan. The scans occur in repetitive cycles so that information is simultaneously exchanged between selectively interconnected stations and lines. Sequencer 152 steps the selector at the end of each time slot and provides control signals to timer 133**.

Figure 5:
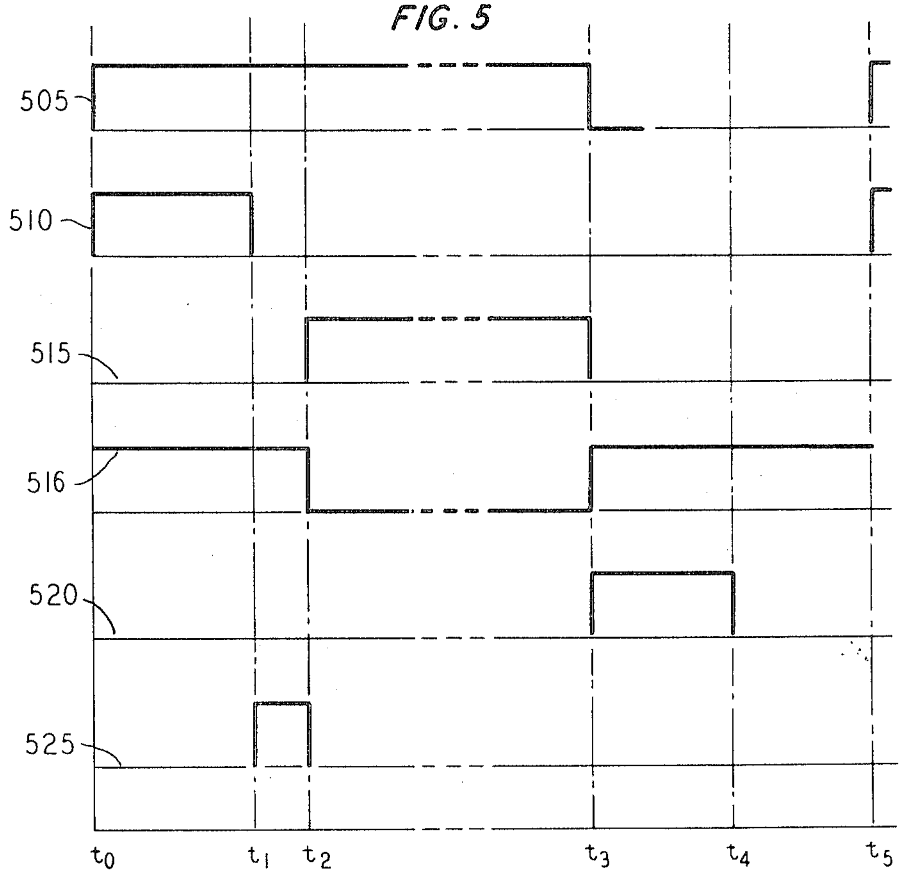
FIG. 5 shows waveforms illustrating the operation of the embodiments depicted in FIGS. 1, 2A and 2B.

Assume for purposes of description that information is exchanged between station 101–1 and line **103–*n* during the time slot illustrated in FIG. 5. The information signal from station 101–1 is applied to filter 102–1 and is stored on capacitor 107–1. In like manner the information signal on line 103–*n* is stored on capacitor 108–*n*. At the beginning of the time slot, $t_0$ on FIG. 5, a signal is applied from selector 153 of control 140 via lead 144–1 to open sampling gate 110–1, and a separate signal is applied from selector 153 via lead 146–*n* to open sampling gate 111–*n*. These signals are illustrated in waveform 505 of FIG. 5. When gate 110–1 is opened, the voltage on capacitor 107–1 is transmitted to bus 124 and the voltage on capacitor 108–*n* is transmitted to bus 126. Bus 124 is connected to timer circuit 133 via lead 131 and bus 126 is connected to timer circuit via lead 130**.

Figure 3:
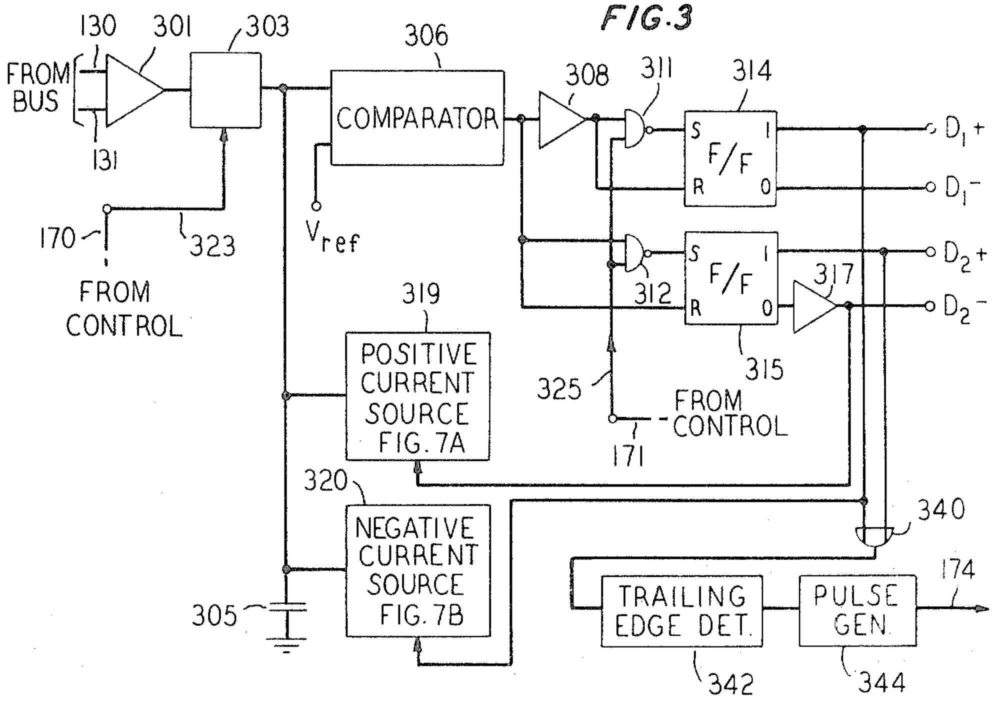
FIG. 3 depicts a timer circuit useful in the embodiments of FIGS. 2A and 2B.

Timer circuit 133 is shown in FIG. 3 and comprises differential amplifier 301, sampling gate 303, storage capacitor 305, comparator 306, flip-flops 314 and 315, and current sources 319 and 320. Differential amplifier 301 is connected to bus 124 via lead 131 and to bus 126 via lead 130. At time $t_0$, a sampling signal is sent from sequencer 152 of control 140 via leads 170 and 323 to sampling gate 303. This signal samples the output of amplifier 301 and is illustrated on waveform 510. Between times $t_0$ and $t_1$ the sampled output of amplifier 301 is applied to storage capacitor 305. This output corresponds to the voltage difference between buses 124 and 126. The voltage difference is stored on capacitor 305 and is applied to comparator 306 wherein it is compared to a reference voltage which may be a ground reference level. If the voltage difference is positive, signifying that the voltage on bus 124 is more positive than the voltage on bus 126, the output of comparator 306 is a low-logic level. This low-logic level is inverted in inverter 308 and the high output of inverter 308 is applied to NAND-gate 311. Waveform 525 is applied via leads 171 and 325 to gates 311 and 312 between $t_1$ and $t_2$. Since the output of the comparator is a low-logic level, both inputs to gate 311 are high; gate 311 is opened; and a log-logic level output from this gate sets flip-flop 314. Gate 312 is not opened at this time because the low-logic level output of comparator 306 inhibits gate 312.

The one output of flip-flop 314 is high and the high signal, DI+ illustrated in waveform 515, is transmitted from flip-flop 314 to negative current source 122. The low-zero output of flip-flop 314 and signal D1−, illustrated in waveform 516, are applied to positive current source 123. These current sources are high-impedance constant-current sources which produce equal magnitude and opposite polarity currents. Current source 122 removes charge from capacitor 107–1 and current source 123 applies charge to capacitor **108–*n*. The one output of flip-flop 314 is also applied to negative current source 320. This negative current source removes the charge from capacitor 305 at a constant rate. When the voltage on capacitor 305 is equal to the reference voltage $V_{ref}$, comparator 306 switches and its output becomes high. In response to the high-logic level, a low-logic level is applied via inverter 308 to the reset input of flip-flop 314. Flip-flop 314 is reset at time $t_3$ and current sources 122 and 123 are disabled together with current source 320. At time $t_3$, sampling gates 110–1 and 111–*n* are closed so that capacitors 107–1 and 108–*n* are isolated from the common buses. In this way, the timing of the time slot is determined by the sampled voltage difference between buses 124 and 126. In accordance with the invention, the duration of the pulses on waveforms 515 and 516 varies with the sampled voltage difference obtained from amplifier 301 and the duration of the time slot corresponds to the actual signal energy exchanged between capacitors 107–1 and 108–*n***.

Where capacitor 305 is charged to a negative voltage because bus 126 is more positive than bus 124, comparator 306 produces a high-level output which causes gate 311 to be inhibited and allows gate 312 to open in response to a signal from sequencer 152 applied via leads 171 and 325. Flip-flop 315 is then set and current sources 120 and 121 are activated. This causes capacitor 108–*n* to discharge and capacitor 107–1 to charge. Current source 320 is also enabled to discharge capacitor 305. When capacitor 305 reaches the reference voltage $V_{ref}$, flip-flop 315 is reset via comparator 306 which reverts to a low level state. The resetting of flip-flop 315, in turn, causes current sources 120, 121 and 320 to be disabled.

Figure 7A:
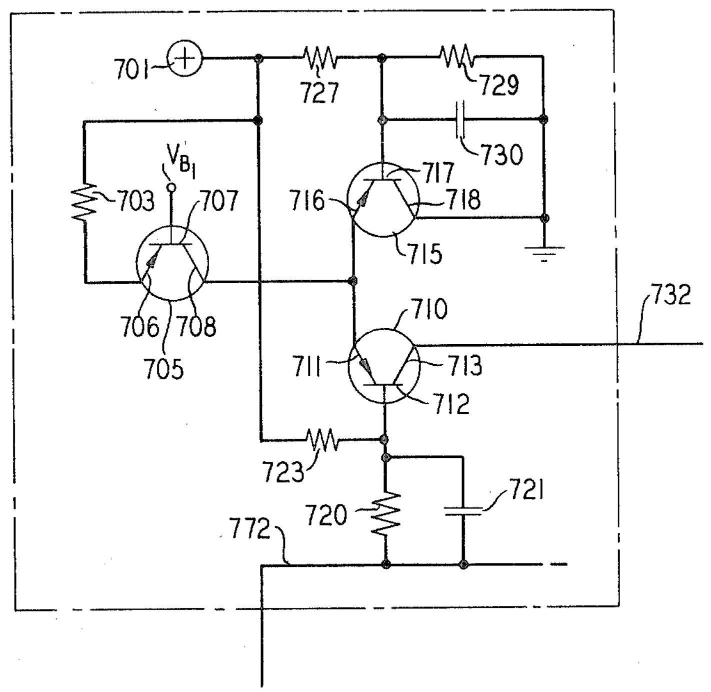
FIGS. 7A and 7B illustrate current source arrangements useful in FIGS. 1, 2A and 2B.

The circuit shown in FIG. 7A may be incorporated in positive current source 120 or positive current source 123 of FIG. 1 to provide the positive constant current required for energy transferred between the selectively connected capacitors. It is to be understood that other constant current circuit arrangements known in the art may also be used. Referring to FIG. 7A, emitter 706 of transistor 705 receives a predetermined current from the source including voltage source 701 and resistor 703. Base 707 is biased at voltage $VB_1$ so that transistor 705 is conducting with its collector base diode reverse biased. In this mode of operation, transistor 705 provides a constant current which normally flows into emitter 716 of transistor 715 since transistor 716 is normally turned on by means of the divider network connected to base 717. This divider network comprises resistors 727 and 729 which resistors are arranged so that the emitter-base diode of transistor 715 is forward biased. Capacitor 730 provides a bypass path to filter noise appearing on base 717.

Lead 772 is connected to cable 137 so that negative going waveform 516 may be applied to base 712 of transistor 710 via the coupling network including resistor 720, capacitor 721, and resistor 723. This network is arranged to normally reverse bias base 712 in the absence of a negative-going signal on lead 772. When a negative-going signal is applied to lead 772 in response to the operation of timer circuit 133, transistor 710 is saturated and the constant current from collector 708 is applied to lead 732 via the emitter-collector path of transistor 710. When transistor 710 conducts, emitter 716 of transistor 715 is reverse biased and the current from transistor 705 is then applied to lead 732. This arrangement permits a positive constant current from a high-impedance source to be applied to the selected one of buses 124 or 126.

Figure 7B:
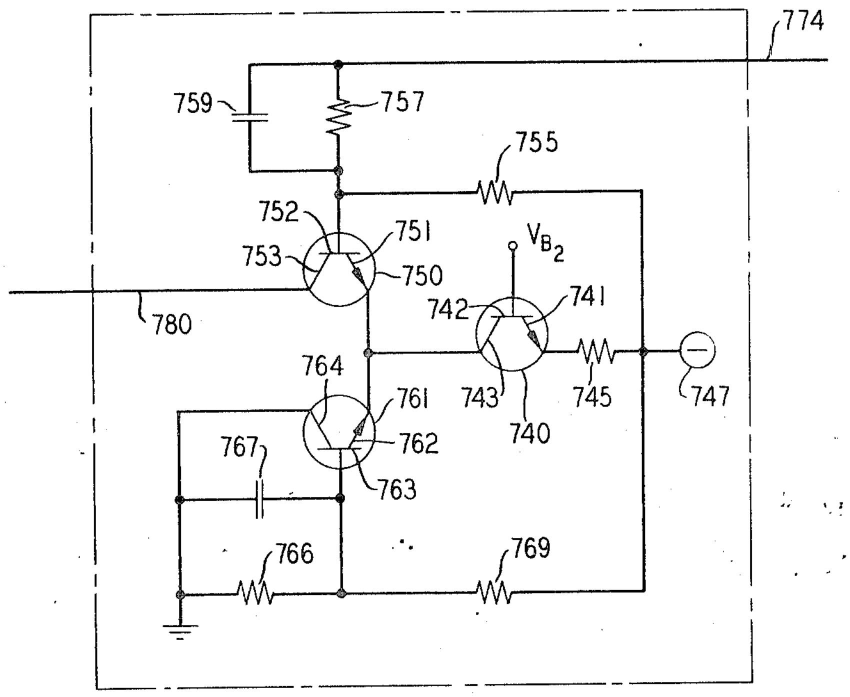

A negative constant-current source is shown in FIG. 7B. The arrangement therein comprises transistors 761, 750 and 740. Negative-voltage source 747 and resistor 745 provides a negative current for emitter 741 of transistor 740. The bias voltage $VB_2$ on base 742 causes transistor 740 to conduct so that the collector-base diode thereof is reverse biased. This provides a constant current to normally conducting transistor 761. The base network arrangement including negative source 747, resistors 769 and 766, and capacitor 767 forward biases the base emitter diode of transistor 761 so that this transistor is saturated. This leaves transistor 750 in a nonconducting state. When a positive-going pulse is applied to lead 774 from timer circuit 133 via cable 137, base 752 is made positive through the network including resistors 757, 755 and capacitor 759. The base-emitter diode of transistor 750 then conducts and the current from collector 743 is applied through the emitter collector path of transistor 750 to lead 780. With transistor 750 conducting, transistor 761 is cut off. In this way a high-impedance negative-current source is provided. Where the circuits of FIGS. 7A and 7B are used in current sources 120 and 121, lead 732 is connected to bus 126 whereby a positive current source is provided for capacitor 108–*n*. Lead 780 is connected to bus 124 whereby a negative current source is provided for capacitor 107–1. Where the current on lead 732 and lead 780 are equal in magnitude, a constant current is transferred between capacitor 107–1 and capacitor 108–*n*. The circuits of FIGS. 7A and 7B may serve as current sources 122 and 123 by connecting lead 732 to bus 124 and lead 780 to bus 126. The selection of the current source is provided by timer circuit 133 which selectively provides control signals D1+, D1−, D2+, and D2− to circuits 120 or 123.

Assume the voltage at capacitor 107–1 is $V_1$ and the voltage at capacitor 108–*n* is $V_2$ between $t_1$ and $t_2$, and that each of capacitors 107–1 and 108–*n* has a capacitance $C_0$ and further that $V_1 > V_2$. In this event, current sources 122 and 123 are activated as hereinbefore described and a constant current $I_0$ flows from capacitor 107–1 to current source 122. An equal constant current $I_0$ flows from source 123 to capacitor 108–*n*. The voltage removed from capacitor 107–1 during the time $T_0$ when waveform 515 is positive going is $$\frac{I_0 T_0}{C_0}$$

but, due to the operation of circuit 133, $$T_0 = \frac{C_0}{I_0}|V_1 - V_2|$$

Therefore the final voltage on capacitor 107–1 at $t_3$ is $$Vf_{107-1} = V_1 - \frac{I_0 T_0}{C_0} = V_1 - \frac{I_0}{C_0}\left(\frac{C_0}{I_0}|V_1 - V_2|\right) = V_2 \quad (1)$$

In like manner the final voltage on capacitor 108–*n* at $t_3$ is $$V_{f_{108-n}} = V_2 + \frac{I_0 T_0}{C_0} = V_2 + \frac{I_0}{C_0}\left(\frac{C_0}{I_0}|V_1 - V_2|\right) = V_1 \quad (2)$$

Thus the voltage $V_1$ is transferred from capacitor 107–1 to capacitor 108–*n* and the voltage $V_2$ is transferred from capacitor 108–*n* to capacitor 107–1. The current $I_0$ is selected to provide the maximum rate of charge of the storage capacitors consistent with the limitations of the sampling gates through which the current $I_0$ passes.

Where the voltage on capacitor 108–*n* is more positive than that of capacitor 107–1, the voltage difference signal at the output of amplifier 301 (FIG. 3) is negative. As hereinbefore described, capacitor 305 is charged to a negative voltage. The output of comparator 306 is then high and flip-flop 315 is set so that the outputs of timer circuit 133 on cable 137 are applied to activate current sources 120 and 121. In this event, the more positive sampled voltage from capacitor 108–*n* is transferred to capacitor 107–1 and the less positive sampled voltage from capacitor 107–1 is transferred to capacitor 108–*n*. It should be noted that the constant current applied to capacitor 305 need not be as large as the current $I_0$ and that a much smaller current may be used by altering the value of capacitor 305.

After the exchange of information is completed at time $t_3$, sampling gates 110–1 and 111–*n* are opened to disconnect filter circuits 102–1 and 104–*n* from buses 124 and 126, respectively. This is shown by the return of waveform 505 to the lower-logic level. Waveform 515 returns to the low level at $t_3$ and waveform 516 returns to the high level at $t_3$. Buses 124 and 126 remain charged to the voltage thereon just before the closing of gates 110–1 and 111–*n*. A signal from timer circuit 133 is applied to sequencer 152 via lead 174 at the end of the current transfer period.

The signal on lead 174 is produced at the end of the pulse produced at the output of either flip-flop 314 or flip-flop 315. The output of OR-gate 340 changes from a high level to a low level at $t_3$ at the trailing edge of waveform 515. Trailing edge detector 342 responds to the output of OR-gate 340 at $t_3$ by producing a pulse which is appropriately shaped in pulse generator 344 and applied therefrom to lead 174. In response to the pulse from generator 344, sequencer 152 applies a signal shown on waveform 520 which causes quenching gates 113 and 114 to be opened via leads 150 and 151. The opening of these gates connects buses 124 and 126 to ground reference so that the buses are discharged preparatory to the beginning of a new time slot. At $t_4$, buses 124 and 126 are discharged to the ground reference potential and the system is ready for the start of a new time slot period.

During the new time slot period, station 101–*n* may be connected to bus 124 via gate 110–*n* and line 103–1 may be connected to bus 126 via gate 111–1. The operations in the new time slot are substantially similar to the one hereinbefore described except the voltage exchange occurs between capacitors 107–*n* and 108–1.

The time slots occur sequentially in repetitive cycles at a rate which permits simultaneous exchange of information between the active stations and lines of the time division system shown in FIG. 1. It should be noted, in accordance with the invention, that the time slot intervals are of variable duration and that each time slot is limited to the duration required to transfer the sampled information energy to be exchanged. Where speech signals are exchanged, the average transfer period is much smaller than the peak transfer period because there is a large proportion of silence in the total time. The time slots, in accordance with the invention, are on the average short in duration and the scans may be made shorter. The time savings can be used both to increase bus traffic capacity and to permit cheaper per channel circuitry.

In FIG. 1, each filter circuit is connectable to a common bus via a separate sampling gate. Where large numbers of filter circuits are used, the capacitance of the common bus may become so large that severe transmission losses are experienced and the quenching of the buses may be incomplete so that crosstalk between channels results. Because constant-current generators are used to transfer signal energy, the resistance of the sampling gates and the inductance of the common buses have little or no effect on the energy transfer. This permits segregating the stations and lines in small groups for reliability and to minimize shunt capacitance on the common buses by using local buses for each group and a second sampling gate to interconnect the local bus to the common bus.

Figure 2A:
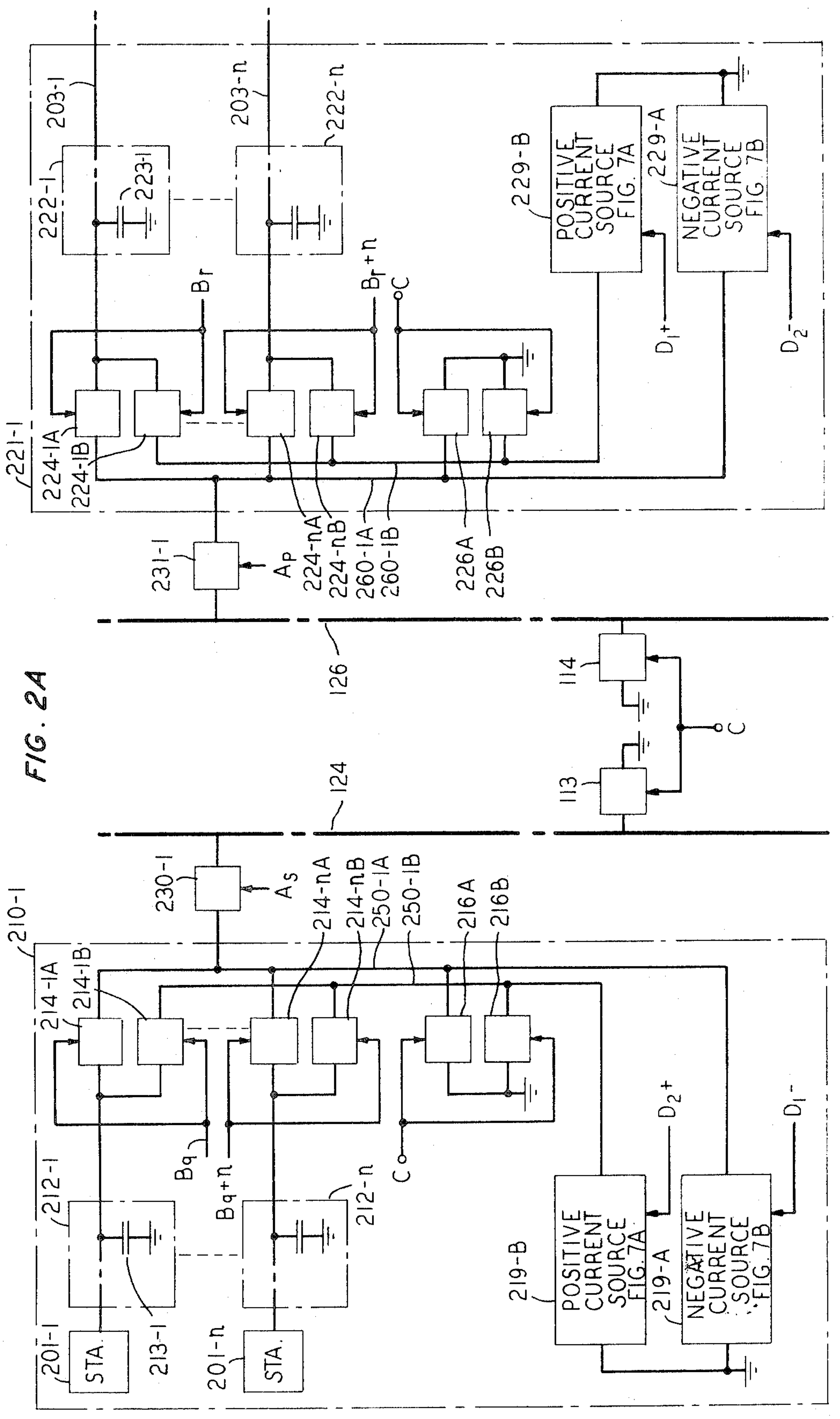
FIGS. 2A and 2B depict another illustrative embodiment of the invention in which a plurality of local groups are connected to each common bus.
Figures 2B, 2C:
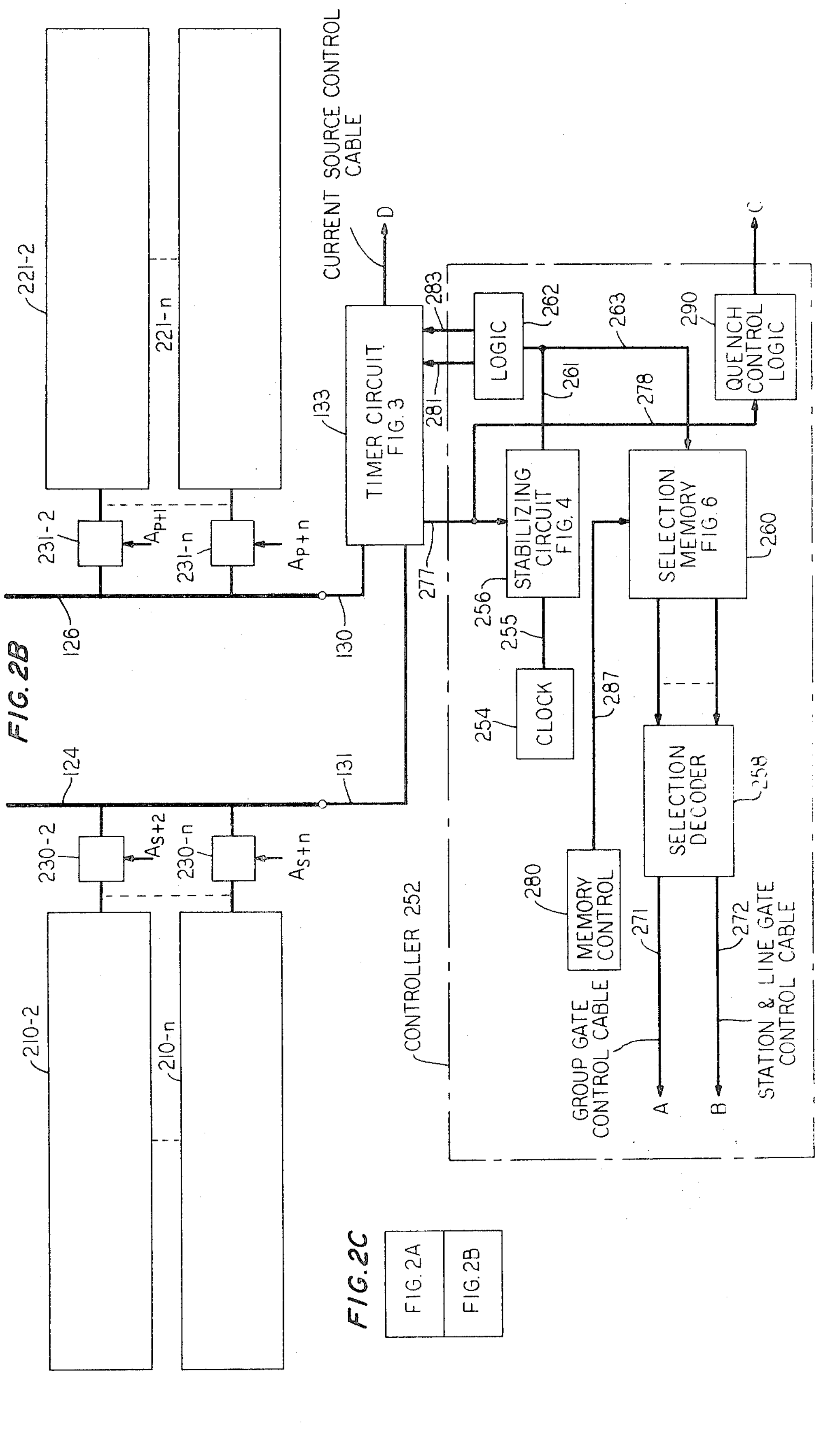
FIG. 2C shows the arrangement of FIGS. 2A and 2B.

FIGS. 2A and 2B show another embodiment illustrative of the invention wherein the stations and the lines are divided into groups. Each group comprises a pair of local buses, one of which is connected to an associated common bus through a sampling gate. Each group further comprises separate positive and negative current sources. This current source arrangement optimizes the transfer of energy through the system. In this way, the size of the common buses is not limited but transmission through the system may be optimized.

In the time division arrangement of FIG. 1, the duration of each scan depends on the actual energy transferred during its time slots. Therefore the scans are variable in duration and the sampling of each active line-station pair does not repeat at precisely determined periods. Such an arrangement tends to introduce random noise into the exchanged signals, which random noise is partially filtered in the filter circuits and the station equipment of the system. The noise may be minimized by providing limits for the variation in scan duration. This is accomplished in the embodiment of FIGS. 2A and 2B by the introduction of a stabilizing circuit hereinafter described which controls the start of each time slot period so that the total variations within each scan are limited. In FIGS. 2A and 2B, there is shown a pair of common buses 124 and 126. Common bus 124 is connectable to station groups 210–1 through 210–*n* and common bus 126 is connectable to line groups 221–1 through 221–*n*. Group 210–1 is representative of the station groups associated with bus 124. Group 210–1 comprises stations 201–1 through 201–*n*. Each station is connected to a pair of local buses via a pair of sampling gates. Local bus 250–1A is connectable to filter 212–1 via sampling gate 214–1A and to filter 212–*n* via sampling gate 214–*n*A. In like manner, local bus 250–1B is connectable to filter 212–1 via sampling gate 214–1B and to filter 212–*n* via sampling gate 214–*n*B. Bus 250–1A is further connected to negative current source 219–A and bus 250–1B is connected to positive current source 219–B. Quenching gates 216–A and 216–B are connected to local buses 250–1A and 250–1B, respectively, so that the buses may be discharged at the end of each energy transfer time period. Local bus 250–1A is also connectable to common bus 124 via sampling gate 230–1.

Group 210–2 is substantially similar to group 210–1 except that its local bus is connected to common bus 124 through gate 230–2. In like manner group 210–*n* is connected to common bus 124 via gate 230–*n*. The arrangement of the groups connected to common bus 126 is substantially similar to that described except that each filter in these groups is connected to a line rather than to a station.

Assume for purposes of description that station 201–1 is connected to line 203–1 during the particular time slot illustrated in FIG. 5. At the start of this time slot ($t_0$ on FIG. 5) the addresses of station 201–1 and line 203–1 are read from selection memory 360 and these addresses are applied to selection decoder 258. Cable 272 provides signals to select a particular pair of station gates and a particular pair of line sampling gates. In this case signal $B_q$ from cable 272 is applied to sampling gates 214–1A, 214–1B, and signal $B_r$ from cable 272 is applied to sampling gates 224–1A and 224–1B. The opening of sampling gates 214–1A and 214–1B in response to signal $B_q$ connects filter 212–1 to local buses 250–1A and 250–1B. Similarly, the opening of sampling gates 224–1A and 224–1B in response to signal $B_r$ connects filter 222–1 to local buses 260–1A and 260–1B. Signals $A_s$ and $A_p$ from cable 271 are applied to group sampling gate 230–1 and to group sampling gate 231–1, respectively.

Under control of signal $A_s$ from cable 271, sampling gate 230–1 is opened and local bus 250–1A is connected to common bus 124. In like manner, signal $A_p$ from cable 271 opens gate 231–1 and local bus 260–1A is connected to common bus 126. The opening of these sampling gates permits the voltage on capacitor 213–1 associated with station 201–1 to be transmitted to bus 124 and also permits the voltage on capacitor 223–1 to be transmitted to bus 126. The voltages on the common buses are then applied to the timer circuit of FIG. 3 via leads 130 and 131.

As hereinbefore described with respect to FIG. 1, sampling gate 303 of FIG. 3 is opened in response to a signal on leads 281 and 323 so that the voltage difference between the buses is stored in capacitor 305. The signal of lead 281 is generated in stabilizing circuit 256 as hereinafter described and is shown in waveform 510.

Where the voltage on capacitor 213–1 is more positive than the voltage on capacitor 223–1, capacitor 305 is charged to a positive voltage. Comparator 306 is operative to set flip-flop 314 via inverter 308 and gate 311 at $t_2$ under control of the pulse appearing on lead 283. Signals D1+ and D1− are then applied from flip-flop 314 to the current sources in the system illustrated on FIGS. 2A and 2B. In particular signal D1−, illustrated in waveform 516, is applied to negative current source 219–A and signal D1+, illustrated in waveform 515, is applied to positive-current source 229–B. Current source 219–A causes capacitor 213–1 to be discharged via sampling gate 214–1A and local bus 250–1A. Current source 229–B causes capacitor 223–1 to be charged via local bus 260–1B and sampling gate 224–1B. It should be noted that the current for charging and discharging the station and line filter capacitors is transmitted through the local buses and not the common buses. Common buses 124 and 126 are only used to sample the initial voltages on the connected capacitors.

As hereinbefore described, when capacitor 305 is discharged to the reference voltage on comparator 306 via negative-current source 320, flip-flop 314 is reset, and current sources 219–A and 229–B are disabled. At this time, $t_3$ on FIG. 5, the voltage exchange between capacitor 213–1 and 223–1, is complete; and a signal is applied to quench control logic 290 via leads 277 and 278. Quench logic control 290 provides a signal C illustrated in waveform 520 that is applied to quench gates 113, 114, 216–A, 216–B, 226–A and 226–B. Gates 113 and 114 operate to return buses 124 and 126 to ground potential. Similarly, gates 216–A and 216–B return local buses 250–1A and 250–1B to ground potential and gates 226–A and 226–B return local buses 260–1A and 260–1B to ground potential. This occurs in the interval between $t_3$ and $t_4$ illustrated in waveform 520 on FIG. 5. In this manner, a transfer of information takes place between station 201–1 and line 203–1. In accordance with this invention, the transfer time corresponds to the initial sampled voltage difference between capacitor 213–1 and capacitor 223–1. Advantageously, the conversion factor between the initial bus voltage difference and the current pulse duration can be adjusted to provide a zero loss or even small gain.

If, at the beginning of the sampling period, capacitor 223–1 is more positive than capacitor 213–1, flip-flop 315 on FIG. 3 is set and signals D2+ and D2– are enabled. This causes positive-current source 219–B to be activated whereby capacitor 213–1 is charged positively via local bus 250–1B through sampling gate 214–1B. Signal D2– activates negative-current source 229–A whereby capacitor 223–1 is discharged via sampling gate 224–1A and local bus 260–1A.

Figure 6:
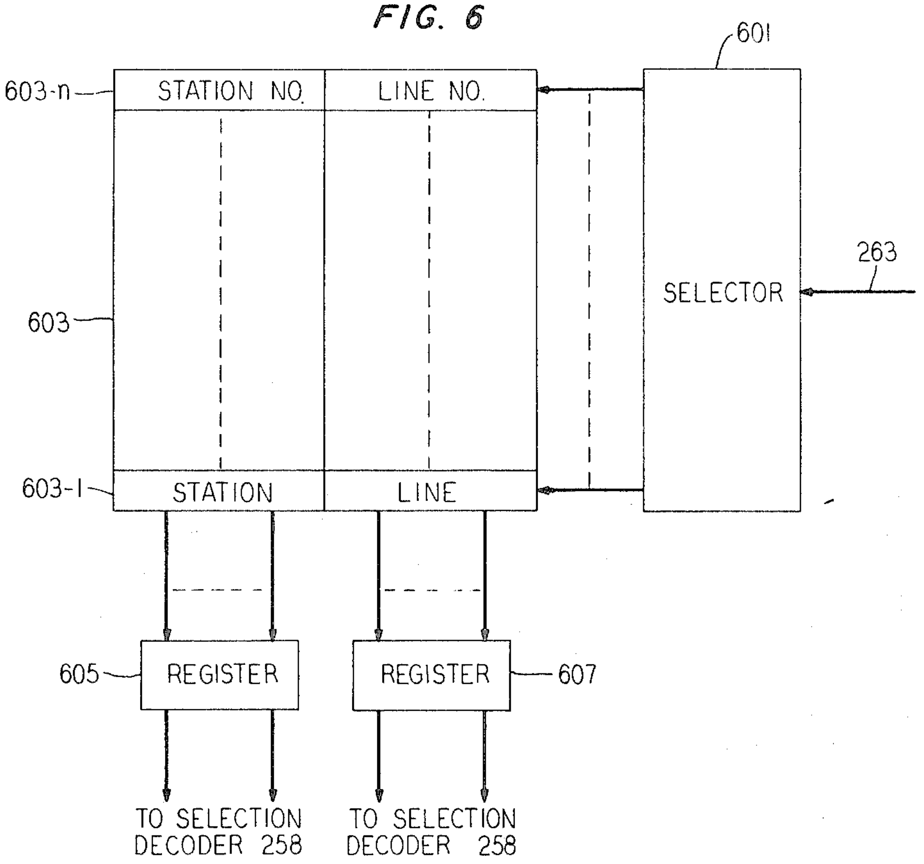
FIG. 6 illustrates a selection memory circuit that may be used in the embodiments of FIGS. 1, 2A and 2B.

Memory control 280 in controller 252 provides means for changing the active station-line lists in selection memory 260 and may comprise circuits well known in the art. Memory 260 is illustrated in FIG. 6. Referring to FIG. 6, each row of storage array 603 comprises a station designation and a line designation. For example, a particular station-line pair is illustrated in row 603–1. Another station-line pair is illustrated in row 603–*n*. Selector 601 receives a signal from lead 263 at the beginning of each time slot which designates which station-line pair is to be read out into registers 605 and 607 and transferred therefrom to selection decoder 258. In this way a particular station-line pair is selected during each time slot so that information may be exchanged therebetween. The rows of storage array 603 are read sequentially during each scan whereby all active station-line connections are made during said scan.

Since the duration of each time slot is not fixed and varies in accordance with the sampled voltage difference between the connected capacitors, the scan duration is also variable; and it is desirable to provide limits for the variations in scan periods whereby random noise introduced by the variations is minimized. In the system illustrated in FIGS. 2A and 2B this is accomplished through the use of a logic circuit such as stabilizing circuit 256 illustrated on FIG. 4. A similar arrangement may be used in the embodiment illustrated in FIG. 1. The stabilizing circuit receives periodic pulses from clock 254. These synchronized pulses are applied at a predetermined rate which corresponds to the estimated average time slot duration. Stabilizing circuit 256 also receives pulses at the end of each time slot from circuit 133 via lead 277. The stabilizer circuit is operative to permit the start of a new time slot only when certain timing relationships exist between the pulses from clock 254 and the pulses from circuit 133.

Figure 4:
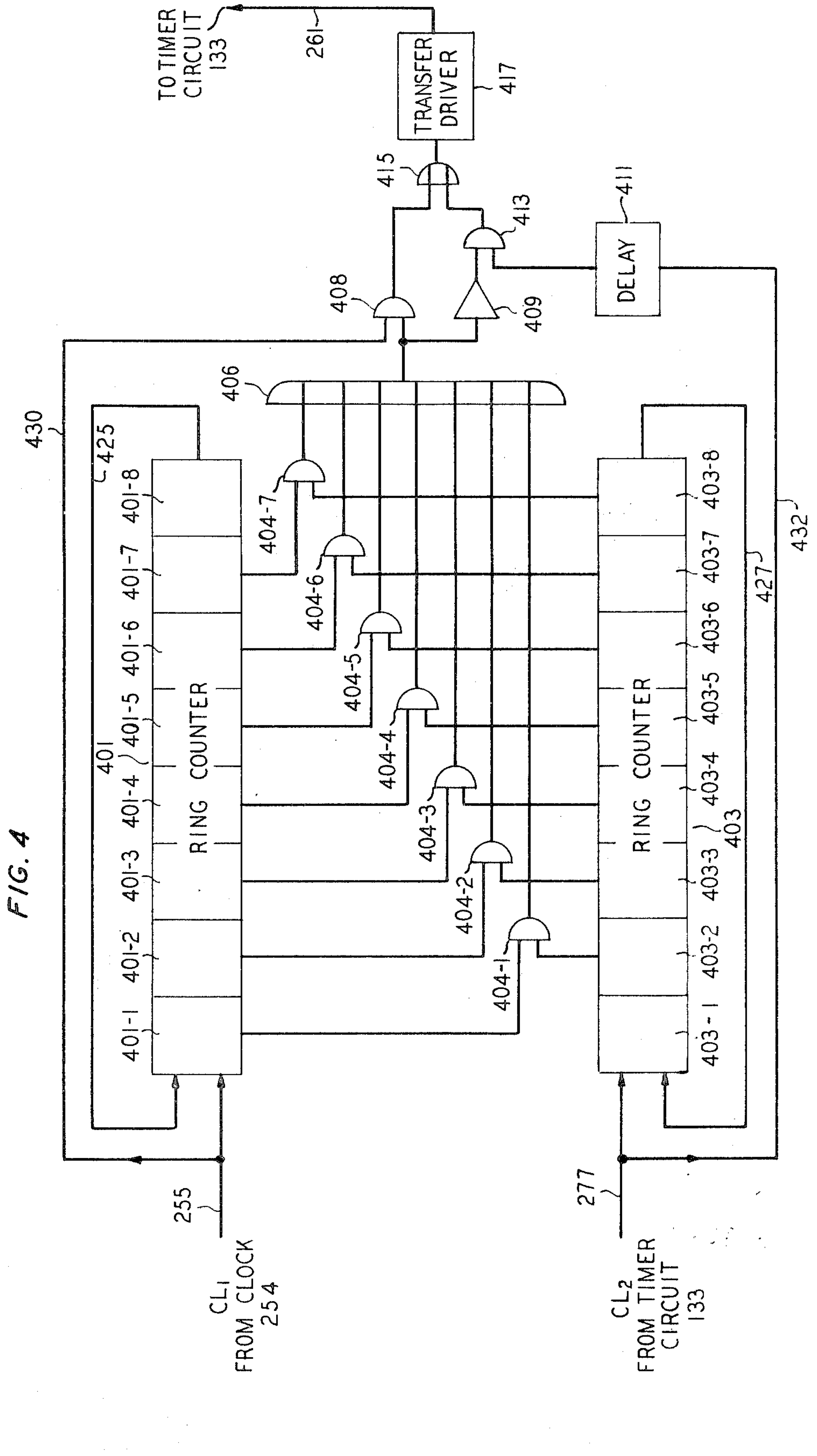
FIG. 4 depicts a stabilizing circuit useful in the embodiments of FIGS. 1, 2A and 2B.

Referring to FIG. 4, the stabilizing circuit therein comprises ring counters 401 and 403, each of which has eight stages. Initially, a pulse is inserted in stage 401–1 of ring counter 401 and stage 403–1 of ring counter 403. As is well known in the art, the ring counters are arranged to shift the inserted pulse one stage to the right upon receipt of an input signal. Ring counter 425 receives input signals from clock 254 via lead 255. These clock pulses, denoted as $CL_1$, are synchronous and occur at a predetermined rate corresponding to an interval just greater than the average time slot duration. Ring counter 403 receives input signals from timer circuit 123 via lead 277 at the end of each time slot. These pulses are denoted as $CL_2$. Since the time slot durations are variable depending on the energy to be transferred therein, pulses $CL_2$ need not occur at the same rate as clock pulses $CL_1$. Thus, if a particular time slot requires a long duration in response to a large sampled voltage difference, several $CL_1$ pulses from clock 254 are applied to ring counter 401 before the succeeding $CL_2$ pulse appears on lead 277. Counter 403 then lags behind counter 401. In this event, the stabilizer circuit operates to permit all $CL_2$ pulses to enable the start of another time slot via logic 262 and lead 281 without delay.

Consider the situation where stage 401–4 is in the one state. But, because of a long duration time slot, stage 403–1 is in the one state. In this event, none of AND-gates 404–1 through 404–7 are open so that all inputs to OR-gate 406 are low. The output of OR-gate 406 is then low and gate 408 is blocked. The low output from gate 406 is inverted in inverter 409 and an enabling signal is applied to AND-gate 413. Upon the occurrence of the next $CL_2$ pulse at the end of the present time slot, stage 403–1 is reset to the zero state and stage 403–2 is set to the one state. The $CL_2$ is also applied to gate 413 via lead 432 and delay 411. The length of the delay 411 is adjusted to permit the shifting of ring counter 403 prior to the application of the $CL_2$ pulse to gate 413. The high input from inverter 409 on gate 413 permits this $CL_2$ pulse to pass through gate 413 and OR-gate 415 to transfer driver 417. Transfer driver 417 thereupon generates a pulse which is applied to timer circuit 133 via lead 261, logic 262, and lead 281 to start the next time slot. This process is continued until the $CL_2$ clock pulses cause ring counter 403 to be one stage ahead of ring counter 401.

If stage 401–4 of counter 401 is in the one state while stage 403–5 of counter 403 is also in the one state, the high outputs of stages 401–4 and 403–5 open gate 404–4 to produce a high output on OR-gate 406. This high output enables gate 408 and inhibits gate 413. Transfer drive 417 remains quiescent and the start of the next time slot is delayed until the $CL_1$ clock pulse is applied to gate 408 via lead 430. When the $CL_1$ pulse occurs, gates 408 and 415 are opened and a pulse is transmitted from driver 417 through logic 262 to start the next time slot.

From the foregoing description it is obvious that the occurrence of time slots is limited to the rate provided by clock 254. If the $CL_2$ pulses occur at a faster rate, one of gates 404–1 through 404–7 is enabled and the start of the next time slot is delayed until the synchronous pulses from clock 254 force counter 401 to catch up. The processing of channels is interrupted to adjust the channel sampling rate. In this way the scan period is adjusted and variations of scan duration are limited. Where counter 401 is ahead of counter 403, there is no delay in the start of the time slot intervals and the processing of channels is uninterrupted. The sampling rate is forced to track the synchronous clock during short energy transfers and is allowed to proceed as fast as possible to catch up with the synchronous clock when the time slot periods fall behind as a result of one or more long duration energy transfers.

It is essential that the period between the synchronous clock pulses from clock 254 be longer than the average time slot including addressing, sampling, energy transfer and quenching for the counters to remain in the desired relationship. The foregoing stabilization scheme results in a quasi-synchronous sampling arrangement which on the average spends just slightly more than the average energy transfer time on each station-line connection. The scheme advantageously permits peak energy transfers while reducing the duration of the scan periods.

Figure 8:
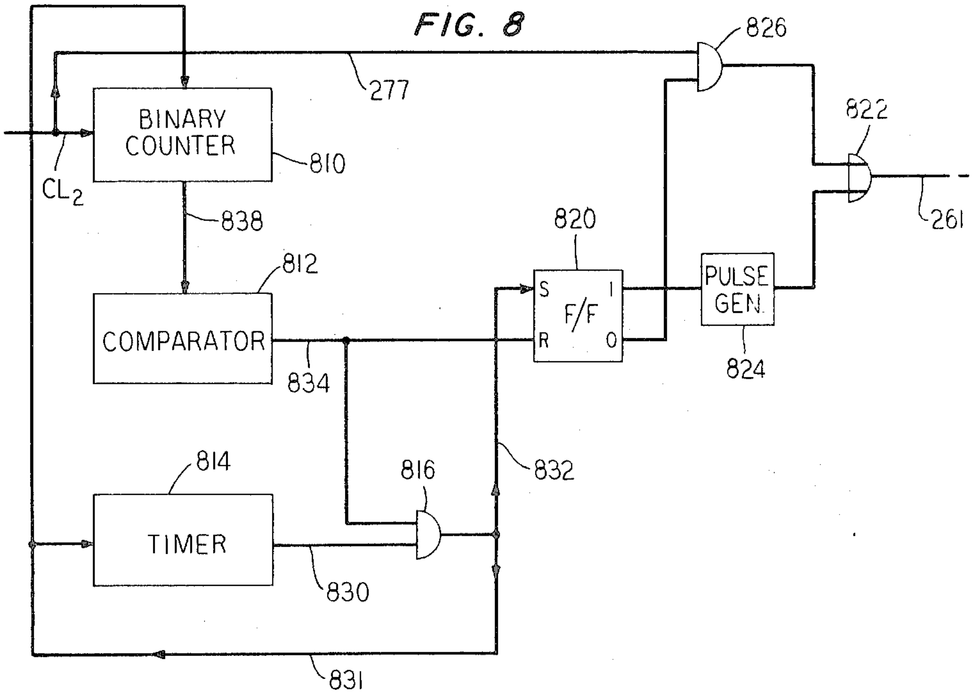
FIG. 8 depicts another form of stabilizing circuit useful in the embodiments of FIGS. 1, 2A and 2B.

FIG. 8 illustrates another form of stabilizing circuit useful in the embodiments of FIGS. 1, 2A and 2B. This stabilizing circuit is operative to divide the scan period into a plurality of stabilized periods. During each stabilized period, a predetermined number of time slots are allowed. If these time slots are completed before the end of the stabilizing period, the start of the next time slot is delayed until the stabilizing period is completed. In this way the variations in time slots are limited so that random noise due to asynchronous sampling is reduced. Where the desired number of time slots in a stabilizing period are not completed at the end of the period, the stabilizing period is extended so that no samplings are omitted.

Referring to FIG. 8, binary counter 810 is advanced in response to $CL_2$ pulses from lead 271 occurring at the end of each time slot. The state of counter 810 represents the number of time slots occurring since the beginning of the present stabilizing period. The output of binary counter 810 is applied to comparator 812 via cable 838. Comparator 812 is operative to compare the state of binary counter 810 with a fixed code corresponding to the number of time slots permitted in each stabilizing period. Timer 814 provides an output pulse on lead 830 to inhibit gate 816 for the duration of the stabilizing period. Flip-flop 820 is set to the one state at the beginning of each stabilizing period and is reset when a match is obtained in comparator 812. This controls the passage of $CL_2$ pulses through gate 826 which gate provides pulses to start a new time slot.

Assume for purposes of description that signal has just been applied to start timer 814 at the beginning of a new stabilizing period from AND-gate 816 via lead 831. At this time binary counter 810 is reset to the zero state and a signal from lead 832 sets flip-flop 820 which in turn triggers pulse generator 824. Generator 824 then provides a pulse to start the first time slot of the new stabilizing period via gate 822 and logic 262. The $CL_2$ pulses generated during this stabilizing period then pass through gate 822 to start successive time slots.

$CL_2$ pulses occurring at the end of each time slot advance binary counter 810 and the output of counter 810 is compared to the allowable number of stabilizing period time slots stored in comparator 812. When the output of binary counter 810 matches the fixed code in comparator 812, the desired number of time slots has been completed. Under normal circumstances, the time required for the desired number of time slots is less than the stabilizing period which is timed by timer 814. This is so because the stabilizing period is preset to be somewhat larger than the time required for the completion of the allowable number of expected average time slots in the stabilizing period. Upon a match, the output of comparator 812 provides a high signal to flip-flop 820. This high signal resets flip-flop 820 so that further $CL_2$ pulses are prevented from passing through gate 826 to start a new time slot. The output of comparator 812 is also applied to enable gate 816. Upon the termination of the stabilizing period, timer 814 provides a high signal to gate 816 via lead 830. This high signal sets flip-flop 820 to cause a pulse to be generated in generator 824 which pulse passes through gate 822. The high signal from gate 816 also starts the timing of a new stabilizing period in timer 814, and resets binary counter 810 to zero. In this way, a minimum period is provided for each stabilizing period.

Where long duration time slots are encountered during a stabilizing period, the output of timer 814 alerts gate 816 prior to a match in comparator 812. Gate 816 is not enabled until a match occurs and flip-flop 820 remains set so that $CL_2$ pulses are allowed to pass through gates 826 and 822. The timing of a new stabilizing period is not started until the match occurs. Upon the occurrence of a match flip-flop 820 is set and the change of state of the one output of flip-flop 820 causes a pulse to be generated by generator 824 which pulse passes through gate 822 to lead 261 to initiate a new time slot. In this way, the required number of time slots are completed before the start of a new stabilizing period. Although the stabilizing period is extended, in this case, the requisite number of connections is made and each connection is sampled.

While the invention has been described by reference to specific embodiments, it is to be understood that many changes and modifications may be made by those skilled in the art without departing from the spirit and scope of the invention. For example, a single bipolar current source may be connected between the common buses in FIG. 1 so that a constant current can pass between the two buses under the control of the timing circuit shown therein. A monostable multivibrator circuit, the timing period of which is determined by the sampled signal differences from the buses, may be used in timer circuit 133 in place of the circuit shown in FIG. 3.

What is claimed is:

1. A time division switching system comprising first and second groups of storage devices, means selectively connectable to each storage device for detecting the difference between the signal on a selected first group storage device and a signal on a selected second group storage device during a distinct time period, means responsive to said detected signal difference for applying a first-type signal to said selected first group storage device for a time interval corresponding to said detected signal difference, and means responsive to said detected signal difference for applying a second-type signal to said selected second group storage device for the time interval corresponding to said detected signal difference.

2. A time division switching system according to claim 1 wherein said detecting means comprises means for concurrently sampling the signal on said selected first group storage device and the signal on said selected second group storage device, means connected to said sampling means responsive to said sampled signals for producing a signal corresponding to the difference of said sampled signals, and means responsive to said difference signal for producing a pulse having a duration corresponding to said detected signal difference, said first-type signal-applying means comprises means responsive to said pulse for applying a constant amplitude signal of one polarity to said selected first group storage device for said pulse duration, and said second-type signal-applying means comprises means responsive to said pulse for applying a constant amplitude signal of the opposite polarity to said selected second group storage device for said pulse duration.

3. A time division switching system according to claim 2 wherein each of said constant amplitude signal applying means comprises first means for producing a constant-current pulse of one polarity and second means for producing a constant current pulse of the opposite polarity, and said detecting means further comprises means responsive to the polarity of said detected difference signal for enabling one of said first and said second constant-current pulse-producing means.

4. A time division switching system according to claim 3 wherein said sampling means comprises a first and a second bus, gating means for selectively connecting each first group storage device to said first bus, gating means for selectively connecting each second group storage device to said second bus, and means for connecting said first bus and said second bus to said difference signal producing means during said distinct time period.

5. A time division switching system according to claim 4 further comprising means responsive to the termination of said pulse duration for disabling said selected first storage device gating means, and for disabling said selected second group storage device gating means, and means responsive to the termination of said pulse duration for quenching said first and second buses for a predetermined time.

6. A time division switching system comprising a first and a second group of storage devices, a first and a second bus, means for producing a plurality of sequentially occurring time slots in repetitive cycles, means for connecting a selected first group storage device to said first bus in a distinct time slot, means for connecting a selected second group storage device to said second bus in said distinct time slot, means connected to said first and second buses responsive to the difference between the signal on said selected first group storage device and the signal on said selected second group storage device for generating a pulse having a duration corresponding to said signal difference, means responsive to said pulse for applying a first polarity constant amplitude signal to said first bus for said pulse duration, and means for applying a second polarity constant amplitude signal to said second bus for said pulse duration.

7. A time division switching system according to claim 6 wherein said means for connecting a selected first group storage device to said first bus comprises first gating means connected between each first group storage device and said first bus, said means for connecting a selected second group storage device to said second bus comprises second gating means connected between each second group storage device and said second bus, and further comprises control means including means for opening a selected one of said first gating means and a selected one of said second gating means during said distinct time slot.

8. A time division switching system according to claim 7 wherein said pulse-generating means comprises means connected to said first and second buses for detecting the difference between the signal from said first selected storage device and the signal from said second selected storage device, means responsive to said signal difference operative during a first portion of said distinct time slot for storing a charge corresponding to said signal difference, means responsive to the polarity of said stored charge at the end of said first portion for initiating said generating means pulse, means responsive to said pulse initiation for discharging the stored charge on said storing means at a constant rate, and means responsive to said storing means stored charge attaining a predetermined value for terminating said pulse whereby the duration of said generating means pulse corresponds to said detected signal difference.

9. A time division switching system according to claim 8 wherein each of said constant amplitude signal applying means comprises first means for producing a constant current of one polarity and second means for producing a constant current of the opposite polarity, and means connected between said pulse generating means and said first and second producing means responsive to said generated pulse for selectively enabling one of said first and second producing means.

10. A time division switching system according to claim 7 wherein said control means further includes means responsive to a signal from said pulse-generating means occurring at the termination of said pulse duration for closing said selected first and second gating means and means responsive to said signal from said pulse-generating means for quenching said first and second buses after the closing of said selected first and second gating means for a predetermined time.

11. A time division switching system according to claim 10 wherein said control means includes a source of clock pulses, means for counting said clock pulses, means responsive to the signal occurring at the termination of the generating means pulse for counting time slots, means for comparing the state of said clock pulse counting means with the state of said time slot counting means, said comparing means comprising means for producing a first type output when the state of said time slot counting means is lower than the state of said clock pulse counting means and for producing a second-type output when the state of time slot counting means is higher than said clock pulse counting means, means responsive to said comparing means first-type output at the end of said predetermined time for generating a signal to initiate a time slot and means jointly responsive to said comparing means second-type output and the occurrence of a clock pulse for generating said signal to initiate a time slot.

12. A time division switching system according to claim 11 wherein said clock source comprises means for generating clock pulses having a longer repetition period than the expected average time slot.

13. A time division switching system according to claim 10 wherein said control means includes means responsive to said generating means signal for counting time slots, means for timing a predetermined period, means for comparing the output of said time slot counting means with a predetermined code, said comparing means comprising means for producing a first-type output responsive to said counting means output being different from said code and for producing a second-type output responsive to said counting means output matching said code, means responsive jointly to said generating means signal and said comparing means first-type output for initiating a time slot, means responsive to said comparing means second-type output occurring after the termination of said predetermined period for initiating a time slot and means responsive to said comparing means second-type output occurring after said predetermined period for resetting said counting means and for starting said timing means.

14. A time division switching system according to claim 13 wherein said timing means comprises means for timing a predetermined period greater than the expected average cycle duration.

15. A time division switching system comprising a first common bus; a second common bus; a first group of coupling circuits and a second group of coupling circuits; each coupling circuit comprising a first and a second bus, a plurality of storage devices, means for selectively connecting each circuit storage device to said first and second buses, means for applying a first polarity constant current signal to said first bus, and means for applying a second polarity constant current signal to said second bus; means for selectively connecting each first group circuit first bus to said first common bus; means for selectively connecting each second group circuit first bus to said second common bus; means connected to said first and second common buses responsive to the difference between a signal from a selectively connected first group storage device and a signal from a selectively connected second group storage device for generating a pulse having a duration corresponding to said signal difference; means responsive to said pulse for enabling the first polarity constant current signal applying means of said selected first group circuit for the duration of said pulse; and means responsive to said pulse for enabling the second polarity constant current signal applying means of said selected second group circuit for the duration of said pulse.

16. A time division switching system according to claim 15 wherein said pulse generating means comprises means for sampling the difference between said selectively connected first group storage device signal and said selectively connected second group storage device signal, means for storing a charge corresponding to said signal difference, means responsive to the polarity of said stored charge for initiating said generating means pulse, means responsive to said stored charge polarity for discharging said storing means at a constant rate, and means responsive to said stored charge attaining a predetermined value for terminating said generating means pulse.

17. A time division switching system according to claim 16 further comprises control means responsive to the termination of said generating means pulse for producing a signal, means responsive to said generating means signal for disabling all of said selectively connected means, and means responsive to said generating means signal for quenching said first and second buses and said first and second common buses for a predetermined time.

18. A time division switching system according to claim 17 wherein said control means includes a source of clock pulses, means for counting said clock pulses, means responsive to said generating means signal for counting time slots, means for comparing the state of said clock pulse counting means with the state of said time slot counting means, said comparing means comprising means for producing a first-type output when the state of said time slot counting means is lower than the state of said clock pulse counting means and for producing a second-type output when the state of time slot counting means is higher than said clock pulse counting means, means responsive to said comparing means first type output at the end of said predetermined time for generating a signal to initiate a time slot and means jointly responsive to said comparing means second-type output and the occurrence of a clock pulse for generating said signal to initiate a time slot.

19. A time division switching system according to claim 18 wherein said clock source comprises means for generating clock pulses having a longer repetition period than the expected average time slot.

20. A time division switching system according to claim 17 wherein said control means includes means responsive to said generating means signal for counting time slots, means for timing a predetermined period, means for comparing the output of said time slot counting means with a predetermined code, said comparing means producing a first type output responsive to said counting means output being different from said code, and for producing a second-type output responsive to said counting means output matching said code, means responsive jointly to said generating means signal and said comparing means first-type output for initiating a time slot, means responsive to said comparing means second-type output occurring after the termination of said predetermined period for initiating a time slot and means responsive to said comparing means secondntype output occurring after said predetermined period for resetting said counting means and for starting said timing means.

21. A time division switching system according to claim 20 wherein said timing means comprises means for timing a predetermined period greater than the expected average cycle duration.

22. A time division switching system comprising a plurality of time slots occurring in repetitive cycles, a first common bus, a second common bus, a first group of coupling circuits and a second group of coupling circuits; each coupling circuit comprising a first and a second bus, a plurality of charge storage devices, a pair of gating means for connecting each circuit charge storage device to said first and second buses, means for applying a first polarity constant current signal to said first bus, and means for applying a second polarity constant current signal to said second bus; gating means for connecting each first group circuit first bus to said first common bus; gating means for connecting each second group circuit first bus to said second common bus; means for connecting a selected first group charge storage device to said first common bus during a distinct time slot comprising means for opening the pair of gating means connecting said selected first group charge storage device to its group buses, and means for opening the gating means connecting the selected first group first bus to said first common bus; means for connecting a selected second group charge storage device to said second common bus during said distinct time slot comprising means for opening the pair of gating means connecting said selected second group storage device to its group buses, and means for opening the gating means connecting said selected group first bus to said second common bus; means connected to said first and second common buses responsive to the difference between said selected first group charge storage device signal and said selected second group charge storage device signal for generating a pulse having a duration corresponding to said signal difference; means responsive to said pulse for enabling one of the first and second polarity constant-current signal-applying means of said selected first group circuit for the duration of said pulse; and means responsive to said pulse for enabling the opposite one of the first and second polarity constant-current signal-applying means of said selected second group circuit for the duration of said pulse.

23. A time division switching system comprising first and second groups of storage devices, a first and a second bus, means for selectively connecting a first group storage device to said first bus, means for selectively connecting a second group storage device to said second bus, said selectively connecting means operating concurrently during a distinct time slot of a repetitive group of time slots, characterized in that means are connected to said first and second buses for sampling the difference between the signal on said selectively connected first group storage device and the signal on said selectively connected second group storage device and a constant-current generator is connected to each bus to transfer a current pulse having a duration corresponding to said sampled signal difference between said buses.

24 In a time division switching system, a method for transferring signals between a charge storage device associated with a first charge storage device group and a charge storage device associated with a second charge storage device group in a distinct time slot of a repetitive group of time slots comprising the steps of a. connecting said first group storage device to a first bus and said second group storage device to a second bus during said distinct time slot,
b. sampling the difference between the signal on said first group storage device and the signal on said second group storage device during a first portion of said distinct time slot,
c. generating a pulse having a duration corresponding to said sampled signal difference during a second portion of said distinct time slot,
d. applying a first selected polarity constant current to said first group storage device during said pulse duration, and
e. applying a second selected polarity constant current to said second group storage device during said pulse duration.

25. A time division switching system comprising first and second storage devices to be connected together during time slots of a recurring cycle, means for determining the difference between the signals in one first and one second storage device, and means responsive to said determining means for controlling the time duration of the time slot during which said one first and said one second storage devices are connected together.

26. A time division switching system in accordance with claim 25 further comprising constant-current means for transfering energy between said one first and said one second storage device during said time slot.

27. A time division switching system in accordance with claim 25 further comprising means including timing means for limiting the rate of occurrence of said time slots.

* * * * *